US010954426B2

(12) United States Patent
Han Tan et al.

(10) Patent No.: US 10,954,426 B2
(45) Date of Patent: Mar. 23, 2021

(54) FOAMED TREATMENT FLUIDS FOR LOST CIRCULATION CONTROL

(71) Applicant: Halliburton Energy Services, Inc., Houston, TX (US)

(72) Inventors: Brendon Chia Han Tan, Spring, TX (US); Samuel Jason Lewis, The Woodlands, TX (US); Thomas Jason Pisklak, Cypress, TX (US); Paul Joseph Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 34 days.

(21) Appl. No.: 16/462,146

(22) PCT Filed: Jul. 13, 2018

(86) PCT No.: PCT/US2018/042135
§ 371 (c)(1),
(2) Date: May 17, 2019

(87) PCT Pub. No.: WO2020/013867
PCT Pub. Date: Jan. 16, 2020

(65) Prior Publication Data
US 2020/0270507 A1 Aug. 27, 2020

(51) Int. Cl.
*E21B 33/138* (2006.01)
*C09K 8/487* (2006.01)
(Continued)

(52) U.S. Cl.
CPC ............ *C09K 8/487* (2013.01); *C04B 14/045* (2013.01); *C04B 14/10* (2013.01);
(Continued)

(58) Field of Classification Search
None
See application file for complete search history.

(56) References Cited

U.S. PATENT DOCUMENTS

| 8,685,903 B2 | 4/2014 | Ravi et al. |
| 8,741,818 B2 | 6/2014 | Ravi et al. |
(Continued)

FOREIGN PATENT DOCUMENTS

| WO | 2016081012 | 5/2016 |
| WO | 2016163996 | 10/2016 |

OTHER PUBLICATIONS

ISRWO International Search Report and Written Opinion for PCT/US2018/042135 dated Apr. 9, 2019.

*Primary Examiner* — Andrew Sue-Ako
(74) *Attorney, Agent, or Firm* — Thomas Rooney; C. Tumey Law Group PLLC

(57) ABSTRACT

Methods and compositions for a foamed treatment fluid in a wellbore. A method of treating a lost circulation zone comprising: introducing a foamed treatment fluid into a lost circulation zone in a subterranean formation, wherein the foamed treatment fluid comprises: a cement; a viscosifying agent; a thixotropic additive; a foaming surfactant; a gas; and water; allowing the foamed treatment fluid to set in the lost circulation zone to seal the lost circulation zone. A foamed treatment fluid comprising: a cement; a viscosifying agent; a thixotropic additive; a foaming surfactant; a gas; and water.

20 Claims, 3 Drawing Sheets

(51) Int. Cl.
*C04B 14/04* (2006.01)
*C04B 14/10* (2006.01)
*C04B 16/06* (2006.01)
*C04B 28/04* (2006.01)
*C09K 8/518* (2006.01)
*C04B 103/00* (2006.01)
*C04B 103/40* (2006.01)
*C04B 103/46* (2006.01)

(52) U.S. Cl.
CPC .......... *C04B 16/0675* (2013.01); *C04B 28/04* (2013.01); *C09K 8/518* (2013.01); *E21B 33/138* (2013.01); *C04B 2103/0085* (2013.01); *C04B 2103/40* (2013.01); *C04B 2103/46* (2013.01)

(56) References Cited

U.S. PATENT DOCUMENTS

| | | |
|---|---|---|
| 2004/0171499 A1 | 9/2004 | Ravi et al. |
| 2012/0192768 A1 | 8/2012 | Ravi et al. |
| 2013/0029883 A1* | 1/2013 | Dismuke ................ C09K 8/703 507/219 |
| 2016/0160109 A1 | 6/2016 | Patil et al. |
| 2017/0260819 A1 | 9/2017 | Amanullah et al. |
| 2017/0313926 A1* | 11/2017 | Morgan .................. E21B 21/00 |

\* cited by examiner

FOAMED TREATMENT FLUIDS FOR LOST CIRCULATION CONTROL

BACKGROUND

A natural resource such as oil or gas residing in a subterranean formation can be recovered by drilling a well bore into the formation. A well bore is typically drilled while circulating a drilling fluid through the well bore. Among other things, the circulating drilling fluid may lubricate the drill bit, carry drill cuttings to the surface, and balance the formation pressure exerted on the well bore. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, loss of well control and potential well abandonment. In addition to drilling fluids, problems with lost circulation may also be encountered with other fluids, for example, spacer fluids, completion fluids (e.g., completion brines), fracturing fluids, and cement compositions that may be introduced into a well bore.

One method that has been developed to control lost circulation involves the placement of lost circulation materials into the lost circulation zone. Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation. For a number of reasons, use of lost circulation materials may not provide a desirable level of lost circulation control in all circumstances such as severe and total lost circulation.

Another method that has been developed to control lost circulation involves the placement of a settable composition into the well bore to seal the lost circulation zone. To be effective, the settable composition should ideally maintain a low viscosity while under shear, but, when allowed to remain static, the composition should develop gel strength quickly with the ability to thin and flow when shear is re-applied. Rapid development of compressive strength is also desired after placement into the lost circulation zone. Conventional low-density cement compositions can be used, but typically do not exhibit the properties to successfully seal the zone. Faster setting compositions that can be used include, for example, mixtures of clay and aqueous rubber latex or hydratable polymers, which can become semi-solid upon contact with the drilling fluid, sealing the lost circulation zone. Cement can be added to these systems where additional strength is desired.

BRIEF DESCRIPTION OF THE DRAWINGS

These drawings illustrate certain aspects of some of the embodiments of the present method, and should not be used to limit or define the method.

DETAILED DESCRIPTION

Figure 1:
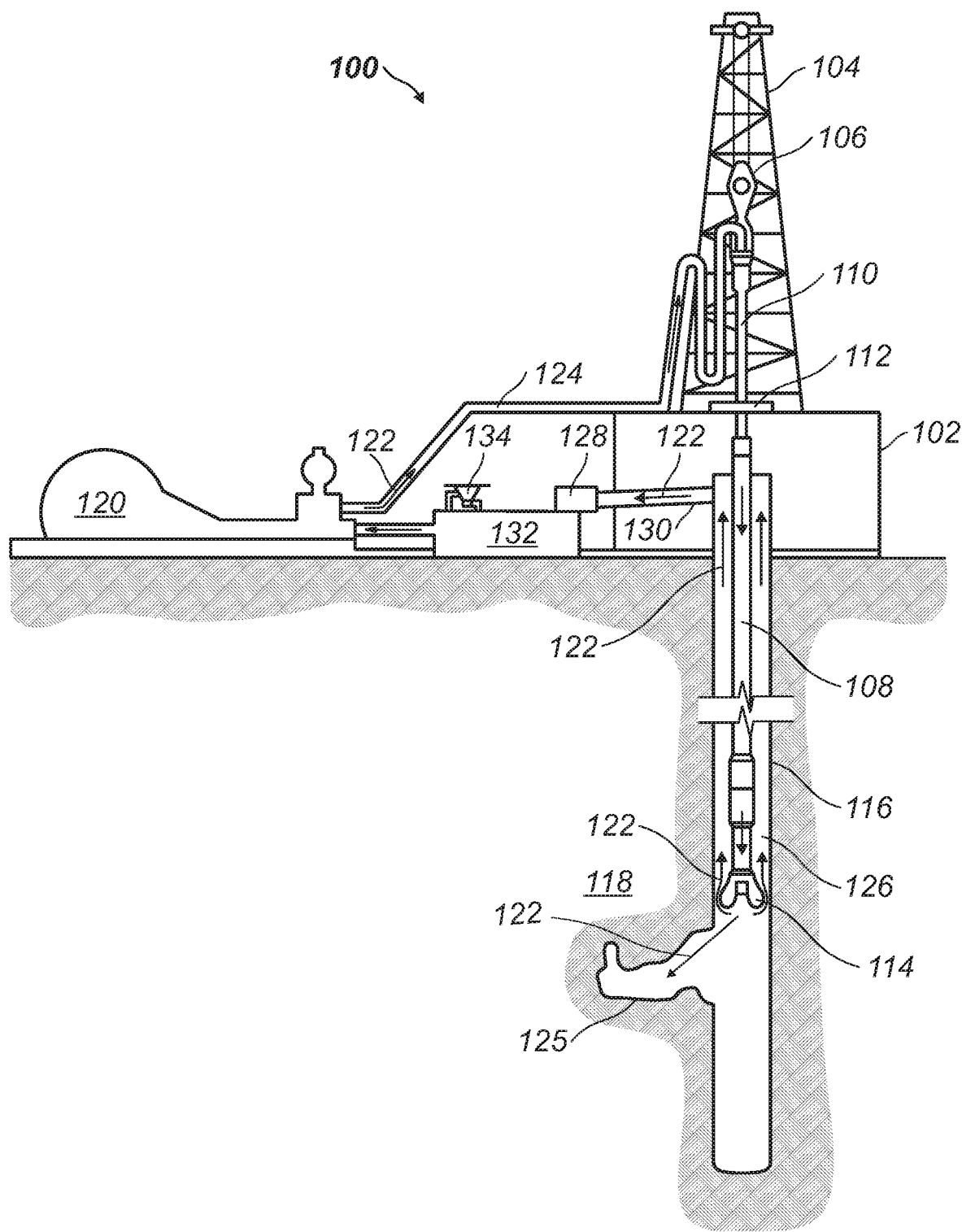
FIG. 1 illustrates loss of a drilling fluid into a lost circulation zone in accordance with certain embodiments.

The present embodiments relate to subterranean operations and, more particularly, in certain embodiments, to foamed treatment fluids and methods of using foamed treatment fluids in subterranean formations for lost circulation control. Lost circulation fluids in the form of foamed treatment fluids may be used to prevent the loss of a variety of treatment fluids. One of the many potential advantages to these methods and compositions are that they may more rapidly plug off or bridge lost circulation zones by developing sufficient static gel strength in a short time frame to be effective at lost circulation control. Other advantages are that they may set to form a hardened mass, possess sufficient compressive strength to support well structures, may isolate subterranean zones, and/or may be thixotropic (e.g., shear-thinning or shear-sensitive) so that the fluids should remain pumpable long enough for placement, but when static, should develop gel strength quickly. In addition, once energized, the foamed treatment should expand to more effectively fill lost circulation zones, as compared to non-foamed treatments fluids.

The foamed treatment fluid may generally comprise cement, a viscosifying agent, a thixotropic additive, a foaming surfactant, gas, and water. Advantageously, the foamed treatment fluids may develop reasonable compressive strengths after activation. The foamed treatment fluids may be suitable for a number of subterranean operations, including those in subterranean formations having bottom hole static temperatures ranging from about 30° F. (−1° C.) to about 450° F. (332° C.) or even greater. In some embodiments, the foamed treatment fluid may be used in subterranean formations having relatively low bottom hole static temperatures, e.g., temperatures less than about 200° F. (93° C.).

Those of ordinary skill in the art will appreciate that embodiments of the foamed treatment fluid generally should have a density suitable for a particular application. The foamed treatment fluid may prepared from a treatment fluid having any suitable density, including, but not limited to, a density in the range of from about 13 pounds per gallon ("lb/gal") (1557 kilograms per meter cubed ("kg/m$^3$")) to about 18 lb/gal (2156 kg/m$^3$), before the treatment fluid is foamed. In certain embodiments, the foamed treatment fluid may have a density in the range of from about 13 lb/gal (1557 kg/m$^3$) to about 14 lb/gal (1677 kg/m$^3$). The density of the treatment fluid may decrease once the treatment fluid is foamed to form the foamed treatment fluid. The foamed treatment fluid may have any suitable density, including but not limited to, a density ranging from about 8 lb/gal (958 kg/m$^3$) to about 11 lb/gal (1318 kg/m$^3$). In certain embodiments, the foamed treatment fluid may have a density of about 11 lb/gal (1318 kg/m$^3$) or less after it has been foamed. Those of ordinary skill in the art, with the benefit of this disclosure, will recognize the appropriate density for a particular application.

The foamed treatment fluids may comprise a cement. Any of a variety of cements suitable for use in subterranean cementing operations may be used in accordance with embodiments of the present invention. Suitable examples may include hydraulic cements that comprise calcium, aluminum, silicon, oxygen and/or sulfur, which set and harden by reaction with water. Suitable cements may include, but are not limited to, Portland cements, pozzolan cements, gypsum cements, high alumina content cements, slag cements, Sorel cements and/or combinations thereof. In certain embodiments, the hydraulic cement may comprise a Portland cement, including Portland cements classified as Classes A, C, G and H cements according to American Petroleum Institute, *API Specification for Materials and Testing for Well Cements*, API Specification 10, Fifth Edition, Jul. 1, 1990. In addition, Portland cements suitable for use in embodiments the present invention may also include those classified as ASTM Type I, II, III, IV, or V. Cement may be present in the foamed treatment fluid in any suitable amount, including but not limited to, an amount of about 1% to about 40%, or about 1% to about 20%, or about 20% to about 40% based on a total weight of the foamed treatment fluid. In some examples the cement may be present in an amount ranging between any of and/or including any of about 10% to about 30% based on a total weight of the foamed treatment fluid. Those of ordinary skill in the art, with the benefit of this disclosure, should be able to select an appropriate amount of cement for a particular application.

Suitable pozzolan cements may include a pozzolan. As used herein, "pozzolan" may be defined as a siliceous or silico-aluminous material that, when in a finely divided form and in the presence of moisture, may chemically react with calcium hydroxide at standard temperatures to form compounds that may have cementitious properties. The pozzolan may comprise a silica source. Any suitable silica source may be used. Examples of suitable silica source may include fly ash, slag, silica fume, fumed silica, crystalline silica, silica flour, cement kiln dust ("CKD"), volcanic rock, natural glasses, metakaolin, diatomaceous earth, zeolite, shale, agricultural waste ash (e.g., rice husk ash, sugar cane ash, and bagasse ash), and combinations thereof among others. Some specific examples of the silica sources will be discussed in more detail below. Where present, the silica source generally may be included in the cement compositions in an amount sufficient to provide the desired compressive strength, density, and/or cost, including but not limited to, an amount of about 10% to about 80%, or about 10% to about 45%, or about 45% to about 80% based on a total weight of the foamed treatment fluid. In some examples the silica source may be present in an amount ranging between any of and/or including any of about 50% to about 80% based on a total weight of the pozzolan cement. Those of ordinary skill in the art, with the benefit of this disclosure, should be able to select an appropriate amount of silica source for a particular application.

An example of a suitable silica source may comprise fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a foamed treatment fluid comprising Class F fly ash. In some embodiments, lime may be mixed with Class F fly ash in an amount in the range of about 0.1% to about 100% by weight of the fly ash. In some instances, the lime may be hydrated lime.

Another example of a suitable silica source may comprise slag. Slag is generally a by-product in the production of various metals from their corresponding ores. By way of example, the production of cast iron can produce slag as a granulated, blast furnace by-product with the slag generally comprising the oxidized impurities found in iron ore. Slag generally does not contain sufficient basic material, so slag cement may be used that further may comprise a base to produce a settable composition that may react with water to set to form a hardened mass. Examples of suitable sources of bases include, but are not limited to, sodium hydroxide, sodium bicarbonate, sodium carbonate, lime, and combinations thereof.

Another example of a suitable silica source may comprise CKD. Cement kiln dust or "CKD", as that term is used herein, refers to a partially calcined kiln feed which is removed from the gas stream and collected, for example, in a dust collector during the manufacture of cement. Usually, large quantities of CKD are collected in the production of cement that are commonly disposed of as waste. Disposal of the CKD as waste can add undesirable costs to the manufacture of the cement, as well as the environmental concerns associated with its disposal. CKD is another component that may be included in examples of the cement compositions.

Another example of a suitable silica source may comprise volcanic rock, such as pumice. Certain volcanic rocks can exhibit cementitious properties, in that they may set and harden in the presence of hydrated lime and water. The volcanic rock may also be ground, for example. Generally, the volcanic rock may have any particle size distribution as desired for a particular application. In certain embodiments, the volcanic rock may have a mean particle size in a range of from about 1 micron to about 200 microns. The mean particle size corresponds to d50 values as measured by particle size analyzers such as those manufactured by Malvern Instruments, Worcestershire, United Kingdom. One of ordinary skill in the art, with the benefit of this disclosure, should be able to select a particle size for the volcanic rock suitable for use for a chosen application.

Another example of a suitable silica source may comprise metakaolin. Generally, metakaolin is a white pozzolan that may be prepared by heating kaolin clay, for example, to temperatures in the range of about 600° to about 800° C.

Another example of a suitable silica source may comprise shale. Among other things, shale included in the cement compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Generally, the shale may have any particle size distribution as desired for a particular application. In certain embodiments, the shale may have a particle size distribution in the range of about 37 micrometers to about 4,750 micrometers.

Another example of a suitable silica source may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples comprising zeolite may comprise zeolite in combination with a cation such as $Na^+$, $K^+$, $Ca^{2+}$, $Mg^{2+}$, etc. Zeolites comprising cations such as sodium may also provide additional cation sources to the cement composition as the zeolites dissolve.

The pozzolan cement may include lime. As used herein, the term "hydrated lime" will be understood to mean calcium hydroxide. The hydrated lime may be included in embodiments of the pozzolan cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the pozzolan cement compositions in an amount in the range of from about 10% to about 100% by weight of the pozzolan cement, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the pozzolan cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

The foamed treatment fluid may comprise a viscosifying agent. Any suitable viscosifying agent may be used, including, but not limited to, clays, synthetic polymers, synthetic copolymers, natural polymers, and/or any combination thereof. Any suitable clay may be used, including, but not limited to, a natural clay, a synthetic clay, and/or any combination thereof. Any suitable natural polymer may be used including, but not limited to, diutan, xantham gum, welan gum, the like, and/or any combination thereof. Suitable synthetic polymers may include but are not limited to, hydroxypropyl guar, the like, and/or any combinations thereof. Suitable synthetic copolymers may include but are not limited to, 2-Acrylamido-2-methylpropane sulfonic acid co N,N-Dimethylacrylamide (AMPS-co-NNDMA), the like, and/or any combinations thereof. Viscosifying agent may be present in the foamed treatment fluid in any suitable amount including but not limited to, about 0.5% to about 98% by weight of the foamed treatment fluid. In some examples the viscosifying agent may be present in an amount ranging between any of and/or including any of about 0.5%, about 5%, about 10%, about 20%, about 30%, about 40%, about 50%, about 60%, about 70%, about 80%, about 90%, or about 98% based on a total weight of the foamed treatment fluid. One of ordinary skill in the art, with the benefit of this disclosure, should recognize the appropriate amount of the viscosifying agent to include for a chosen application.

Thixotropic additives may be included in the foamed treatment fluid to, for example, provide a cement composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, finely divided, high surface-area silica, fumed silica, potassium silicate, silicic sodium silicate, silicic acid, colloidal silicic acid, synthetic clay, and/or combinations thereof. Embodiments of the thixotropic additives may comprise a synthetic clay. In an embodiment, the clay may comprise a synthetic nano-clay. Synthetic clays can be developed having properties similar to or better than naturally occurring clays, for example. An example of a suitable synthetic clay may include a synthetic smectite. Synthetic smectites may be provided as aqueous mixtures of water and synthetic trioctahedral smectites which are similar to the natural clay hectorite. In embodiments, some synthetic smectites may be layered hydrous sodium lithium magnesium silicates, further, some may be modified with tetrasodiumpyrophosphate. Suitable synthetic clays may be considered nano-clay, for example, having at least one dimension less than 1 micron. By way of example, a suitable synthetic clay (e.g., synthetic laponite) may be in the foam of a platelet-like clay particle with a thickness of about 1 nm to about 100 nm and lateral dimensions of in a range of about 1 nm to about 100 nm. The thixotropic additive may be present in the foamed treatment fluid in an any suitable amount, including an amount ranging from 0.1% to about 2% based on a total weight of the foamed treatment fluid. In an embodiment, the thixotropic additive may be present in an amount of about 0.5% to about 2% or about 0.5% to about 1% based on a total weight of the foamed treatment fluid. In an embodiment, the thixotropic additive may be present in an amount of about 0.5% to about 1% by weight of the foamed treatment fluid. In some examples the thixotropic additive may be present in an amount ranging between any of and/or including any of about 0.1%, 0.5%, 1%, 1.5%, or 2% based on a total weight of the foamed treatment fluid. One of ordinary skill in the art, with the benefit of this disclosure, should recognize the appropriate amount of the thixotropic additive to include for a chosen application.

A foaming surfactant may be included in the foamed treatment fluid to, for example, facilitate foaming and/or stabilize the resultant foam formed therewith. In particular, the foamed treatment fluid may be foamed with a foaming surfactant and a gas. The foaming surfactant may include a surfactant or combination of surfactants that reduce the surface tension of the water. By way of example, the foaming surfactant may comprise an anionic, nonionic, amphoteric (including zwitterionic surfactants), cationic surfactant, or mixtures thereof. Examples of suitable foaming surfactants include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming surfactants include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. The foaming surfactant may be present in the foamed treatment fluid in any suitable amount. Suitable amounts may include, but are not limited to, an amount ranging from about 0.5% to about 5% or ranging from about 1% to about 4% based on the volume of water in the foamed treatment fluid. In some examples, the foaming surfactant may be present in an amount ranging between any of and/or including any of about 0.5%, 1%, 2%, 3%, 4%, or 5% based on the volume of water in the foamed treatment fluid. Those of ordinary skill in the art, with the benefit of this disclosure, should be able to select an appropriate amount of foaming surfactant for a particular application.

The foamed treatment fluid may further comprise a gas. Any suitable gas capable of foaming the foamed treatment fluid may be used. In a non-limiting example, the gas may be air, nitrogen, carbon dioxide, methane, helium, argon, and/or combinations thereof. The gas should be present in an amount sufficient to form the desired foam. In an embodiment, the gas may be included in the foamed treatment so as to achieve a foam quality (i.e., % gas by volume of the total composition) of the foamed treatment in the range of a lower limit of about 5%, 10%, 15%, 20%, 25%, 30%, 35%, 40%, 45%, and 50% to an upper limit of about 95%, 90%, 85%, 80%, 75%, 70%, 65%, 60%, 55%, and 50%. As used herein, the term "foam quality" refers to the volume of entrained gas and is defined by the following formula: Foam Quality= (Total Foam Volume–Liquid Volume)/Total Foam Volume. In an embodiment, the gas may be injected into the treatment fluid before, during, or after the treatment fluid is introduced into the wellbore. In an embodiment, the gas may be injected into the foamed treatment fluid by way of an inline mixer.

The foamed treatment fluid may comprise water. The water may be from any source provided that it does not contain an excess of compounds that may undesirably affect other components in the foamed treatment fluid, for example, it may be important that no compounds in the water raise the alkalinity of the treatment fluids unless it is desirable to do so. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable fluid, including, but not limited to, an amount ranging from about 50% to about 90%, or about 50% to about 60%, or about 70% to about 80% based on a total weight of the foamed treatment fluid. With the benefit of this disclosure one of ordinary skill in the art should recognize the appropriate amount of water for a chosen application.

The foamed treatment fluids may comprise properties that would be beneficial for use as a foamed treatment fluid. For example, the lost circulation composition may develop static gel strength in a short time frame enabling them to be effective at lost circulation control. By way of further example, the foamed treatment fluids may set to form a hardened mass with sufficient compressive strength to support well structures. Additionally, the foamed treatment fluids may be thixotropic (e.g., shear-thinning or shear-sensitive) so that the fluids should remain pumpable long enough for placement, but when static, should develop gel strength quickly.

As previously mentioned, embodiments of the foamed treatment fluid may rapidly develop static gel strength. Because the foamed treatment fluid may be considered thixotropic, its viscosity may be reduced when subjected to shear, but, after the shear is removed, the foamed treatment fluid should build back gel strength quickly. The ability to develop gel strength may be characterized by static gel strength. For example, the foamed treatment fluid may be characterized by a 10-second static gel strength of at least about 15 lbf/100 ft$^2$ at room temperature and atmospheric pressure. The foamed treatment fluid may further be characterized by a 10-minute static gel strength of at least about 70 lbf/100 ft$^2$ at room temperature and atmospheric pressure.

The large difference between the 10-second and 10-minute static gel strengths exemplifies the rapid development of gel strength of the foamed treatment fluid. The 10-second and 10-minute static gel strengths are determined using a Fann® Model 35 viscometer in accordance with API Recommended Practice 10B-6 (2010): Recommended Practice on Determining the Static Gel Strength of Cement Formulations.

In addition, the foamed treatment fluids may also have an improved ratio of Young's modulus to compressive strength. By improvement of this ratio, the foamed treatments after setting to form a hardened mass in the lost circulation zone may be more resilient set solid in the lost circulation zone, reducing the likelihood of losses returning after subterranean operations are resumed.

Accordingly, embodiments provide a foamed treatment fluid that comprises a foamed treatment fluid. The foamed treatment fluid may be used in the course of drilling a wellbore in a subterranean formation; the foamed treatment fluid may comprise a foamed treatment fluid that may comprise: cement, silica source, a viscosifying agent, a thixotropic additive, a foaming surfactant, gas, and water. The foamed treatment fluid further may comprise a cement set retarder. The foamed treatment fluid may be used to reduce the loss of drilling fluid into the lost circulation zones of the subterranean formation. In further embodiments, the foamed treatment fluid may be used at any time and during any wellbore operation. The lost circulation fluid may be used to reduce the loss of any treatment fluid to any formation feature.

The foamed treatment fluid may be a thixotropic shear-thinning fluid. A thixotropic fluid is generally described as a fluid that becomes more viscous when flow ceases. It often may develop a gel that requires a sufficient shear stress to overcome this static gelling phenomenon, in order for flow to begin. Once flow begins, a shear thinning or pseudoplastic fluid is one whose apparent viscosity (apparent viscosity being defined as the ratio of shear stress to shear rate) decreases as shear rate increases. Dilatant (shear thickening) fluids are those whose apparent viscosity increases as shear rate increases. The thixotropic and shear-thinning dual nature of foamed treatment fluids will therefore remain fluid while exposed to the agitation of pumping (or any other agitation), however, when the lost-circulation treatment fluid flows into a lost circulation zone and away from a source of agitation the foamed treatment fluid will thicken to seal the lost circulation zone and prevent fluid migration into the lost circulation zone of any fluid flowing adjacent to the sealed lost circulation zone.

Other additives suitable for use in subterranean cementing operations also may be included in embodiments of the foamed treatment fluids. Examples of such additives include, but are not limited to, weighting agents, lightweight additives, gas-generating additives, mechanical-property-enhancing additives, lost-circulation materials, filtration-control additives, fluid-loss-control additives, set-retarding agent, dispersant, thixotropic additives, and combinations thereof. A person having ordinary skill in the art, with the benefit of this disclosure, will readily be able to determine the type and amount of additive useful for a particular application and desired result.

Optionally, the foamed treatment fluid may further comprise sodium hydroxide. Sodium hydroxide may be included in the foamed treatment fluid in order to treat the water present in the foamed treatment fluid. Sodium hydroxide may lower the pH of the treatment fluid. Any suitable amount of sodium hydroxide may be used, including but not limited to, an amount ranging from about 0.05% to about 5% or ranging from about 0.1% to about 1% based on a total weight of the foamed treatment fluid. With the benefit of this disclosure one of ordinary skill in the art should recognize the appropriate amount of water for a chosen application.

As will be appreciated by those of ordinary skill in the art, embodiments of the foamed treatment fluids may be used in a variety of subterranean operations for lost circulation control, including drilling and primary cementing, among others. Collectively, these types of operations may use the foamed treatment fluid as a "treatment fluid." As used herein, the term "treatment," or "treating" fluid refers to any subterranean operation that uses a fluid in conjunction with a desired function and/or for a desired purpose. The term "treatment," or "treating," does not imply any particular action by the fluid.

As previously mentioned, lost circulation zones are often encountered into which drilling fluid (or other fluid) may be lost. As a result, subterranean operations, such as drilling typically, must be terminated with the implementation of remedial procedures, for example. In accordance with embodiments, the foamed treatment fluids may be used to seal the lost circulation zones to prevent the uncontrolled flow of treatment fluids into or out of the lost circulation zones, e.g., lost drilling fluid circulation, crossflows, underground blow-outs and the like. In an embodiment, a foamed treatment fluid comprising a foamed treatment fluid may prepared. After preparation, the foamed treatment fluid may be introduced into the lost circulation zone. In an embodiment, the foamed treatment fluid is pumped through one or more openings at the end of the string of drill pipe. For example, the foamed treatment fluid may be pumped through the drill bit. Once placed into the foamed treatment fluid, the foamed treatment fluid may expand to fill the lost circulation zone and then start to gain gel strength once shear is removed. In the lost circulation zone, the foamed treatment fluid should set to form a hardened mass. This hardened mass should seal the zone and control the loss of subsequently pumped drilling fluid, which allows for continued drilling. In addition to drilling fluids, embodiments of the foamed treatment fluids may also be used to control lost circulation problems encountered with other treatment fluids, for example, spacer fluids, completion fluids (e.g., completion brines), fracturing fluids, and cement compositions that may be placed into a wellbore.

FIG. 1 illustrates loss of drilling fluid 122 into a lost circulation zone 125 while drilling equipment is present in a wellbore 116. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a wellbore 116 that penetrates various subterranean formations 118.

A pump 120 (e.g., a mud pump or other suitable positive displacement pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. A mixing hopper 134 may be communicably coupled to or otherwise in fluid communication with the retention pit 132. The mixing hopper 134 may include, but is not limited to, mixers and related mixing equipment known to those skilled in the art. In alternative embodiments, however, the drilling fluid 122 may not be added to a mixing hopper. In at least one embodiment, for example, there could be more than one retention pit 132, such as multiple retention pits 132 in series. Moreover, the retention put 132 may be representative of one or more fluid storage facilities and/or units where the disclosed foamed treatment fluids may be stored, reconditioned, and/or regulated until desired for use, e.g., as drilling fluid 122.

As illustrated on FIG. 1, at least a portion of the drilling fluid 122 may be lost into lost circulation zone 125. However, the loss of the drilling fluid 122 into the lost circulation zone 125 is undesirable, inter alia, because of the expense associated with the drilling fluid 122 lost into the lost circulation zone 125, loss of time, additional casing strings and, in extreme conditions, loss of well control and potential well abandonment. Accordingly, remedial steps may be taken to control the loss of the drilling fluid 122 into the lost circulation zone 125.

Figure 2:
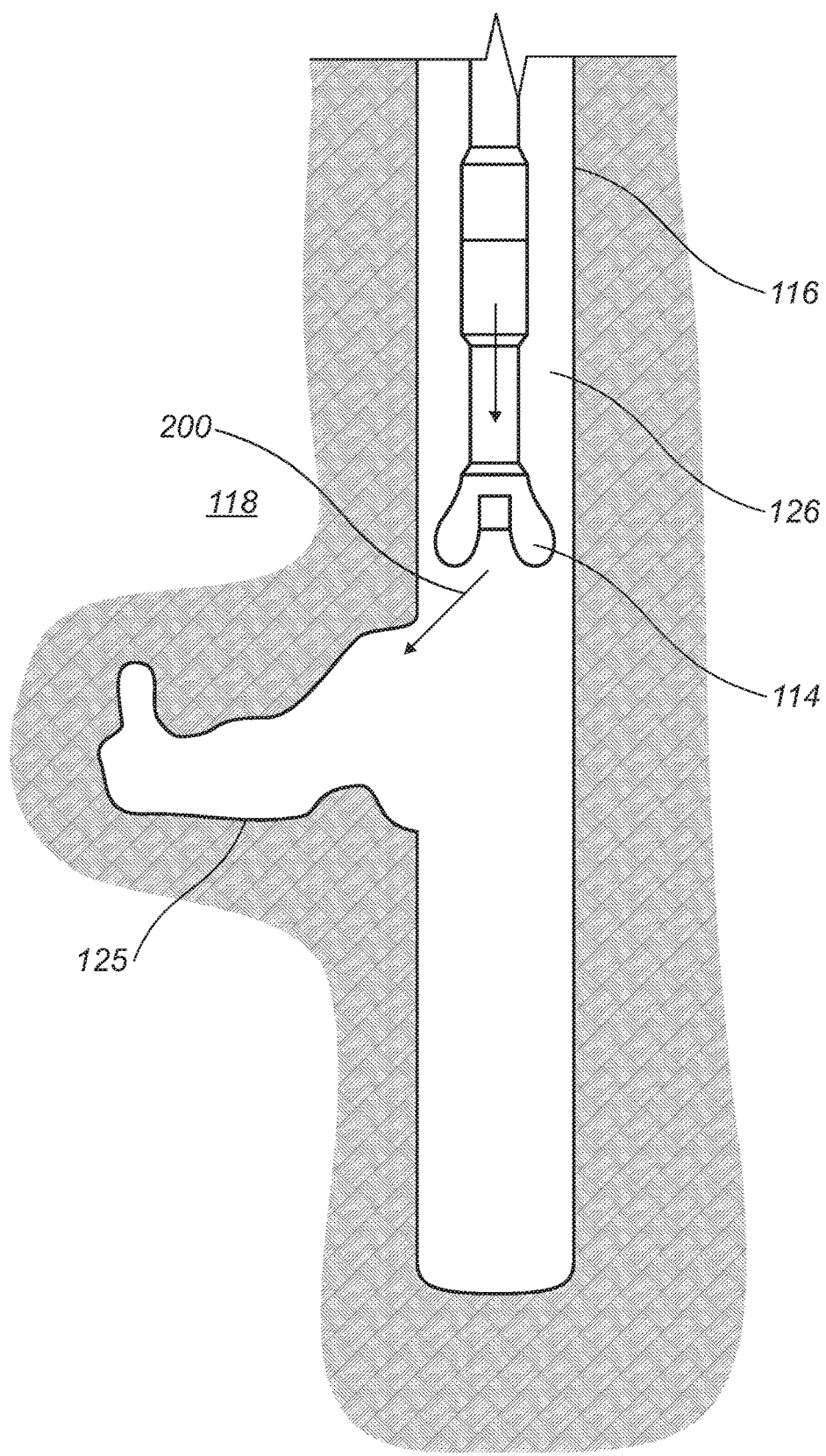
FIG. 2 illustrates the placement of a foamed treating fluid into a lost circulation zone in a wellbore in accordance with certain embodiments.

FIG. 2 illustrates the placement of foamed treatment fluid 200 into lost circulation zone 125. As described herein, foamed treatment fluid 200 may include cement, a viscosifying agent, a thixotropic additive, a foaming surfactant, gas, and water. Additional additives disclosed herein may also be included in the foamed treatment fluid 200. Foamed treatment fluid 200 may be foamed at the surface of wellbore 116. The foamed treatment fluid 200 may be prepared in any suitable way. For example, a foaming surfactant and gas may be added to a treatment fluid as it is being pumped to the wellbore 116. The foamed treatment fluid 200 may then flow down drill string 108 into wellbore 116. Foamed treatment fluid 200 may exit drill bit 114 just above lost circulation zone 125. As illustrated, the foamed treatment fluid 200 may then contact lost circulation zone 125. The foamed treatment fluid 200 that contacts lost circulation zone 125 may no longer be exposed to sufficient shear force to remain fluid and once static, the foamed treatment fluid 200 may thicken to seal lost circulation zone 125 and eventually set to form a hardened mass. In addition, once in the lost circulation zone, the foamed treatment fluid 200 may also expand to fill the lost circulation zone 125. Accordingly, the foamed treatment fluid 200 may reduce the amount of fluid lost in lost circulation zone 125.

Figure 3:
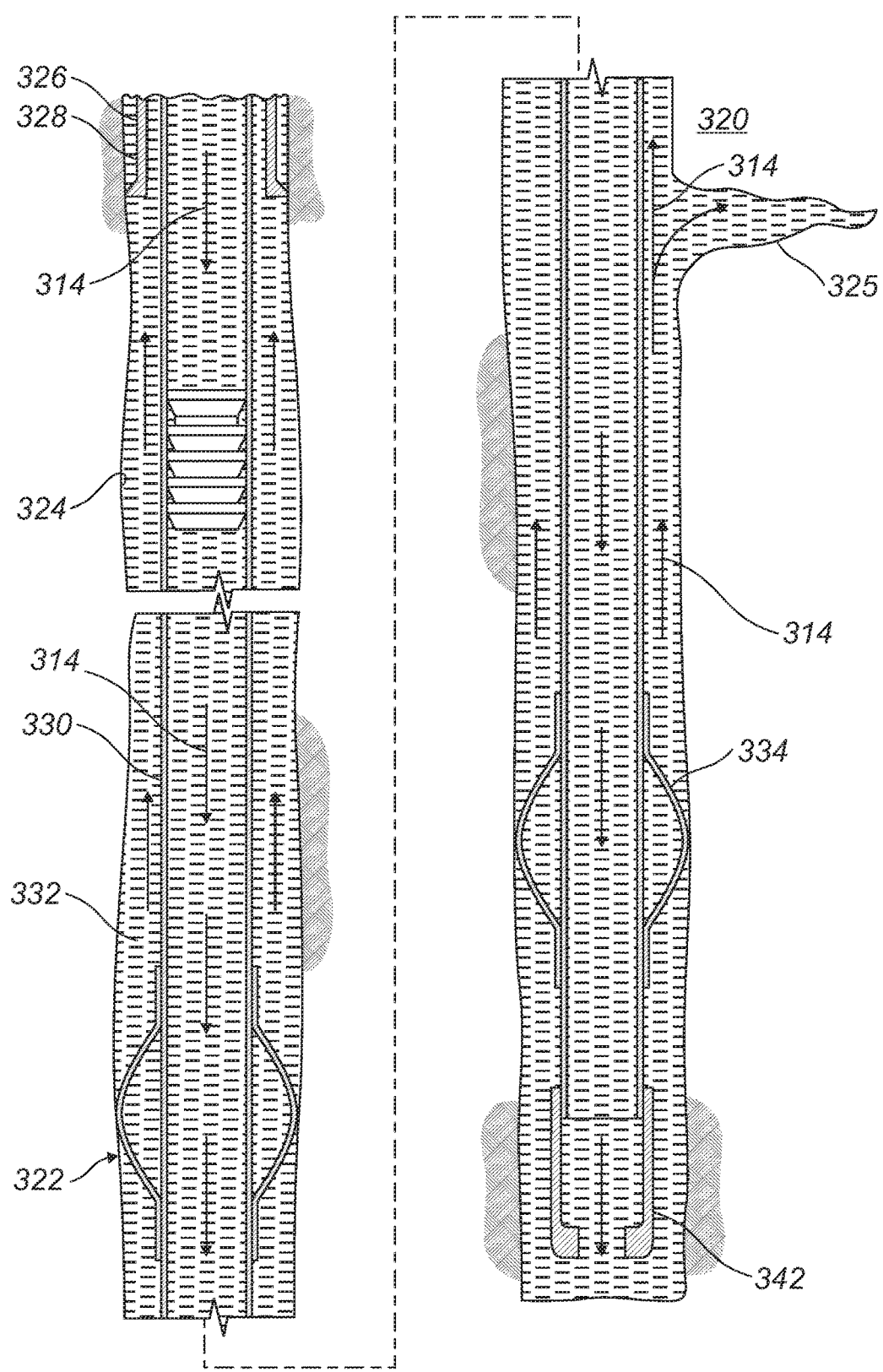
FIG. 3 illustrates the placement of a foamed treatment fluid into a lost circulation zone in a wellbore in accordance with alternative embodiments.

FIG. 3 illustrate an example technique for placing a foamed treatment fluid 314 comprising the foamed treatment fluids disclosed herein into a lost circulation zone 325 while cementing equipment and casing are present in the wellbore 322. Such an embodiment may be used, for example, when it is desired to reduce the loss of displacement fluid into a lost circulation zone 325. It should be noted that foamed treatment fluid 314 may be introduced prior to, concurrently with, or subsequent to the introduction of any other treatment fluid (e.g., a displacement fluid, competition fluid, etc.) into wellbore 322. Any suitable cementing equipment may be used.

Foamed treatment fluid 314, comprising the foamed treatment fluids disclosed herein, may be placed into a subterranean formation 320 in accordance with example embodiments. As illustrated, wellbore 322 may be drilled into the subterranean formation 320. While wellbore 322 is shown extending generally vertically into the subterranean formation 320, the principles described herein are also applicable to wellbores that extend at an angle through the subterranean formation 320, such as horizontal and slanted wellbores. As illustrated, the wellbore 322 comprises walls 324 with lost circulation zones 325. In the illustrated embodiment, a surface casing 326 has been inserted into the wellbore 322. The surface casing 326 may be cemented to the walls 324 of the wellbore 322 by cement sheath 328. In the illustrated embodiment, one or more additional conduits (e.g., intermediate casing, production casing, liners, etc.), shown here as casing 330 may also be disposed in the wellbore 322. As illustrated, there is a wellbore annulus 332 formed between the casing 330 and the walls 324 of the wellbore 322 and/or the surface casing 326. One or more centralizers 334 may be attached to the casing 330, for example, to centralize the casing 330 in the wellbore 322 prior to and during the cementing operation.

With continued reference to FIG. 3, the foamed treatment fluid 314 may be pumped down the interior of the casing 330. The foamed treatment fluid 314 may be allowed to flow down the interior of the casing 330 through the casing shoe 342 at the bottom of the casing 330 and up around the casing 330 into the wellbore annulus 332. As the foamed treatment fluid 314 flows upward through the annulus 332, foamed treatment fluid 314 may contact lost circulation zones 325. If foamed treatment fluid 314 contacts a lost circulation zone 325, foamed treatment fluid 314 may flow into lost circulation zone 325 and may become static if sufficiently removed from a shear force. If static, foamed treatment fluid 314 may rapidly develop gel strength. Once sufficiently gelled, foamed treatment fluid 314 may then seal lost circulation zone 325 and prevent the loss of any treatment fluids (not shown) that subsequently flow adjacent to lost circulation zone 325. Over time, foamed treatment fluid 314 may be allowed to harden and set in lost circulation zone 325, for example, to form a cement sheath that supports and positions the casing 330 in the wellbore 322. While not illustrated, other techniques may also be utilized for introduction of the foamed treatment fluid 314. By way of example, reverse circulation techniques may be used that include introducing the foamed treatment fluid 314 into the lost circulation zone 325 by way of the wellbore annulus 332 instead of through the casing 330.

The exemplary foamed treatment fluid disclosed herein may directly or indirectly affect one or more components or pieces of equipment associated with the preparation, delivery, recapture, recycling, reuse, and/or disposal of the disclosed foamed treatment fluid. For example, the disclosed foamed treatment fluid may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary foamed treatment fluid. The disclosed foamed treatment fluid may also directly or indirectly affect any transport or delivery equipment used to convey the foamed treatment fluid to a well site or downhole such as, for example, any transport vessels, conduits, pipelines, trucks, tubulars, and/or pipes used to compositionally move the foamed treatment fluid from one location to another, any pumps, compressors, or motors (e.g., topside or downhole) used to drive the foamed treatment fluid into motion, any valves or related joints used to regulate the pressure or flow rate of the foamed treatment fluid, and any sensors (i.e., pressure and temperature), gauges, and/or combinations thereof, and the like. The disclosed foamed treatment fluid may also directly or indirectly affect the various downhole equipment and tools that may come into contact with the foamed treatment fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes systems, compositions, and methods that may use the foamed treatment fluids for lost circulation control Without limitation, the systems, compositions, and methods may include any of the following statements:

Statement 1. A method of lost circulation control comprising: introducing a foamed treatment fluid into a lost circulation zone in a subterranean formation, wherein the foamed treatment fluid comprises: a cement; a viscosifying agent; a thixotropic additive; a foaming surfactant; a gas; and water; and allowing the foamed treatment fluid to set in the lost circulation zone to seal the lost circulation zone.

Statement 2. The method of statement 1, wherein the foamed treatment fluid has a 10-second static gel strength of at least about 15 lbf/100 ft$^2$, and a 10-minute static gel strength of at least about 70 lbf/100 ft$^2$.

Statement 3. The method of statements 1 or 2, wherein the cement comprises at least one cementitious material selected from the group consisting of a Portland cement, pozzolanic cement, gypsum cement, high alumina content cement, slag cement, a Sorel cement and combinations thereof.

Statement 4. The method of any one of the preceding statements, wherein the cement comprises a pozzolan cement comprising at least one silica source selected from the group consisting of fly ash, slag, silica fume, fumed silica, crystalline silica, silica flour, cement kiln dust, volcanic rock, perlite, metakaolin, diatomaceous earth, zeolite, shale, agricultural waste ash, and combinations thereof.

Statement 5. The method any one of the preceding statements, wherein the viscosifying agent comprises a clay.

Statement 6. The method any one of the preceding statements, wherein the thixotropic additive comprises at least one component selected from the group consisting of a finely divided, high surface-area silica, fumed silica, sodium silicate, potassium silicate, silicic acid, colloidal silicic acid, and combinations thereof.

Statement 7. The method any one of the preceding statements, wherein the foamed treatment fluid has a density of about 8 lb/gal to about 11 lb/gal.

Statement 8. The method any one of the preceding statements, wherein the foamed treatment fluid in the lost circulation zone reduces loss of a fluid into the lost circulation zone, wherein the fluid is subsequently introduced into the wellbore.

Statement 9. The method any one of the preceding statements, wherein the foamed treatment fluid in the lost circulation zone reduces loss of a drilling fluid circulated in the wellbore while a drill string is disposed within the wellbore.

Statement 10. The method any one of the preceding statements, wherein introducing the foamed treatment fluid comprising pumping the foamed treatment fluid through a drill string and out through a drill bit on the drill string.

Statement 11. The method any one of the preceding statements, wherein the cement comprises a Portland cement, wherein the cement further comprises a pozzolan cement that comprises silica fume, wherein the viscosifying agent comprises a synthetic clay, and wherein the thixotropic additive comprises a sodium silicate.

Statement 12. The method any one of the preceding statements: wherein the cement comprises a Portland cement and is present in an amount of about 10% to about 30% by weight of the foamed treatment fluid; wherein the cement further comprises a pozzolan cement that comprises silica fume, wherein the silica fume is present in an amount of about 0.1% to about 20% by weight of the foamed treatment fluid; wherein the viscosifying agent comprise a synthetic clay and is present in an amount of about 0.25% to about 5% by weight of the foamed treatment fluid; wherein the thixotropic additives comprises a sodium silicate and is present in an amount of about 0.1% to about 5% by weight of the foamed treatment fluid; wherein the foaming surfactant comprises a polyethylene glycol alkyl ether (C6-C10), sulfate ammonium salt and is present in an amount of about 0.25% to about 5% by weight of the foamed treatment fluid; wherein the gas comprises a nitrogen and is present in an amount of about 1% to about 50% by weight of the foamed treatment fluid; wherein the foamed treatment fluid has a density of about 8 lb/gal to about 11 lb/gal; and wherein the foamed treatment fluid further comprises sodium hydroxide in an amount of about 0.1% to about 1% based on a total weight of the foamed treatment fluid.

Statement 13. A method of lost circulation control comprising: introducing a foamed treatment fluid through a drill string, out through a drill bit on the drill string, and into a lost circulation zone in a subterranean formation, wherein the foamed treatment fluid comprises: a cement; a viscosifying agent; a thixotropic additive; a foaming surfactant; a gas; and water; and wherein the foamed treatment fluid has a density of about 8 lb/gal to about 11 lb/gal; allowing the foamed treatment fluid to set in the lost circulation zone to seal the lost circulation zone, such that the foamed treatment reduces loss of drilling fluid into the lost circulation zone, wherein the foamed treatment fluid has a 10-second static gel strength of at least about 15 lbf/100 ft$^2$, and a 10-minute static gel strength of at least about 70 lbf/100 ft$^2$.

Statement 14. The method of statement 13: wherein the cement comprises at least one cementitious material selected from the group consisting of a Portland cement, gypsum cement, high alumina content cement, slag cement, a Sorel cement and combinations thereof; wherein the cement further comprises a pozzolan cement that comprises at least one silica source selected from the group consisting of fly ash, slag, silica fume, fumed silica, crystalline silica, silica flour, cement kiln dust, volcanic rock, perlite, metakaolin, diatomaceous earth, zeolite, shale, agricultural waste ash, and combinations thereof; wherein the viscosifying agent comprises a synthetic clay; and wherein the thixotropic additive comprises at least one component selected from the group consisting of a finely divided, high surface-area silica, fumed silica, sodium silicate, potassium silicate, silicic acid, colloidal silicic acid, and combinations thereof.

Statement 15. The method of statement 13, wherein the cement comprises a Portland cement, wherein the cement further comprises a pozzolan cement that comprises silica fume, wherein the viscosifying agent comprises a synthetic clay, and wherein the thixotropic additive comprises a sodium silicate.

Statement 16. A foamed treatment fluid comprising: a cement; a viscosifying agent; a thixotropic additive; a foaming surfactant; a gas; and water.

Statement 17. The foamed treatment fluid of statement 16, wherein the foamed treatment fluid has a 10-second static gel strength of at least about 15 lbf/100 ft$^2$ at downhole temperature and atmospheric pressure, and a 10-minute static gel strength of at least about 70 lbf/100 ft$^2$ at a downhole temperature and atmospheric pressure.

Statement 18. The foamed treatment fluid of statements 16 or 17: wherein the cement comprises at least one cementitious material selected from the group consisting of a Portland cement, pozzolanic cement, gypsum cement, high alumina content cement, slag cement, a Sorel cement, and combinations thereof; wherein the cement further comprises a pozzolan cement that comprises at least one silica source selected from the group consisting of fly ash, slag, silica fume, fumed silica, crystalline silica, silica flour, cement kiln dust, volcanic rock, perlite, metakaolin, diatomaceous earth, zeolite, shale, agricultural waste ash, and combinations thereof; wherein the viscosifying agent comprises a synthetic clay; and wherein the thixotropic additive comprises at least one component selected from the group consisting of a finely divided, high surface-area silica, fumed silica, sodium silicate, potassium silicate, silicic acid, colloidal silicic acid, and combinations thereof.

Statement 19. The foamed treatment fluid of any one of statements 16 to 18, wherein the cement comprises a Portland cement, wherein the cement further comprises a pozzolan cement that comprises silica fume, wherein the viscosifying agent comprises a synthetic clay, and wherein the thixotropic additive comprises a sodium silicate.

Statement 20. The foamed treatment fluid of any one of statements 16 to 19, wherein the foamed treatment fluid has a density of about 8 lb/gal to about 11 lb/gal.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of lost circulation control comprising:
   introducing a foamed treatment fluid into a lost circulation zone in a subterranean formation, wherein the foamed treatment fluid comprises:
   a cement;
   a viscosifying agent;
   a thixotropic additive;
   a foaming surfactant;
   a gas; and
   water;
   wherein the foaming surfactant comprises a polyethylene glycol alkyl ether (C6-C10), sulfate ammonium salt; and
   allowing the foamed treatment fluid to set in the lost circulation zone to seal the lost circulation zone.

2. The method of claim 1, wherein the foamed treatment fluid has a 10-second static gel strength of at least about 15 lbf/100 ft$^2$, and a 10-minute static gel strength of at least about 70 lbf/100ft$^2$ at least about 15 lbf/100 ft$^2$.

3. The method of claim 1, wherein the cement comprises at least one cementitious material selected from the group consisting of a Portland cement, pozzolanic cement, gypsum cement, high alumina content cement, slag cement, a Sorel cement and combinations thereof.

4. The method of claim 1, wherein the cement comprises a pozzolan cement comprising at least one silica source selected from the group consisting of fly ash, slag, silica fume, fumed silica, crystalline silica, silica flour, cement kiln dust, volcanic rock, perlite, metakaolin, diatomaceous earth, zeolite, shale, agricultural waste ash, and combinations thereof.

5. The method of claim 1, wherein the viscosifying agent comprises a clay.

6. The method of claim 1, wherein the thixotropic additive comprises at least one component selected from the group consisting of fumed silica, sodium silicate, potassium silicate, silicic acid, colloidal silicic acid, and combinations thereof.

7. The method of claim 1, wherein the foamed treatment fluid has a density of about 8 lb/gal to about 11 lb/gal.

8. The method of claim 1, wherein the foamed treatment fluid in the lost circulation zone reduces loss of a fluid into the lost circulation zone, wherein the fluid is subsequently introduced into the wellbore.

9. The method of claim 1, wherein the foamed treatment fluid in the lost circulation zone reduces loss of a drilling fluid circulated in the wellbore while a drill string is disposed within the wellbore.

10. The method of claim 1, wherein introducing the foamed treatment fluid comprising pumping the foamed treatment fluid through a drill string and out through a drill bit on the drill string.

11. The method of claim 1, wherein the cement comprises a Portland cement, wherein the cement further comprises a pozzolan cement that comprises silica fume, wherein the viscosifying agent comprises a synthetic clay, and wherein the thixotropic additive comprises a sodium silicate.

12. The method of claim 1:
   wherein the cement comprises a Portland cement and is present in an amount of about 10% to about 30% by weight of the foamed treatment fluid;
   wherein the cement further comprises a pozzolan cement that comprises silica fume, wherein the silica fume is present in an amount of about 0.1% to about 20% by weight of the foamed treatment fluid;
   wherein the viscosifying agent comprise a synthetic clay and is present in an amount of about 0.25% to about 5% by weight of the foamed treatment fluid;
   wherein the thixotropic additive comprises a sodium silicate and is present in an amount of about 0.1% to about 5% by weight of the foamed treatment fluid;
   wherein the polyethylene glycol alkyl ether (C6-C10), sulfate ammonium salt is present in an amount of about 0.25% to about 5% by weight of the foamed treatment fluid;
   wherein the gas comprises a nitrogen and is present in an amount of about 1% to about 50% by weight of the foamed treatment fluid;
   wherein the foamed treatment fluid has a density of about 8 lb/gal to about 11 lb/gal; and
   wherein the foamed treatment fluid further comprises sodium hydroxide in an amount of about 0.1% to about 1% based on a total weight of the foamed treatment fluid.

13. The method of claim 1, wherein the subterranean formation comprises a bottom hole static temperature ranging from about 30° F. to about 450° F.

14. The method of claim 1, wherein the subterranean formation comprises a bottom hole static temperature ranging from about 30° F. to about 200° F.

15. A method of lost circulation control comprising:
   introducing a foamed treatment fluid through a drill string, out through a drill bit on the drill string, and into a lost circulation zone in a subterranean formation, wherein the foamed treatment fluid comprises:
   a cement;
   a viscosifying agent;
   a thixotropic additive;

a foaming surfactant;
a gas; and
water;
wherein the foaming surfactant comprises a polyethylene glycol alkyl ether (C6-C10), sulfate ammonium salt;
wherein the foamed treatment fluid has a 10-second static gel strength of at least about 15 lbf/100 ft$^2$, and a 10-minute static gel strength of at least about 70 lbf/100 ft$^2$; and
wherein the foamed treatment fluid has a density of about 8 lb/gal to about 11 lb/gal;
allowing the foamed treatment fluid to set in the lost circulation zone to seal the lost circulation zone, such that the foamed treatment reduce loss of drilling fluid into the lost circulation zone.

16. The method of claim 15,
wherein the cement comprises at least one cementitious material selected from the group consisting of a Portland cement, gypsum cement, high alumina content cement, slag cement, a Sorel cement and combinations thereof;
wherein the cement further comprises a pozzolan cement that comprises at least one silica source selected from the group consisting of fly ash, slag, silica fume, fumed silica, crystalline silica, silica flour, cement kiln dust, volcanic rock, perlite, metakaolin, diatomaceous earth, zeolite, shale, agricultural waste ash, and combinations thereof;
wherein the viscosifying agent comprises a synthetic clay; and
wherein the thixotropic additive comprises at least one component selected from the group consisting of fumed silica, sodium silicate, potassium silicate, silicic acid, colloidal silicic acid, and combinations thereof.

17. The method of claim 15, wherein the cement comprises a Portland cement, wherein the cement further comprises a pozzolan cement that comprises silica fume, wherein the viscosifying agent comprises a synthetic clay, and wherein the thixotropic additive comprises a sodium silicate.

18. A method of lost circulation control comprising:
introducing a foamed treatment fluid through a drill string, out through a drill bit on the drill string, and into a lost circulation zone in a subterranean formation, wherein the foamed treatment fluid comprises:
a cement, wherein the cement comprises at least one cementitious material selected from the group consisting of a Portland cement, gypsum cement, high alumina content cement, slag cement, a Sorel cement and combinations thereof, wherein the cement further comprises a pozzolan cement that comprises at least one silica source selected from the group consisting of fly ash, slag, silica fume, fumed silica, crystalline silica, silica flour, cement kiln dust, volcanic rock, perlite, metakaolin, diatomaceous earth, zeolite, shale, agricultural waste ash, and combinations thereof;
a viscosifying agent wherein the viscosifying agent comprises a synthetic clay;
a thixotropic additive, wherein the thixotropic additive comprises at least one component selected from the group consisting of fumed silica, sodium silicate, potassium silicate, silicic acid, colloidal silicic acid, and combinations thereof;
a foaming surfactant, wherein the foaming surfactant comprises a polyethylene glycol alkyl ether (C6-C10), sulfate ammonium salt;
a gas; and
water;
wherein the foamed treatment fluid has a 10-second static gel strength of at least about 15 lbf/100 ft$^2$, and a 10-minute static gel strength of at least about 70 lbf/100 ft$^2$; and
wherein the foamed treatment fluid has a density of about 8 lb/gal to about 11 lb/gal; and
setting the foamed treatment fluid in the lost circulation zone to seal the lost circulation zone, such that the foamed treatment reduce loss of drilling fluid into the lost circulation zone.

19. The method of claim 18, wherein the subterranean formation comprises a bottom hole static temperature ranging from about 30° F. to about 450° F.

20. The method of claim 18, wherein the subterranean formation comprises a bottom hole static temperature ranging from about 30° F. to about 200° F.

* * * * *